United States Patent [19]
Yonezawa et al.

[11] Patent Number: 5,905,973
[45] Date of Patent: May 18, 1999

[54] SHOPPING BASKET PRESENTATION METHOD FOR AN ONLINE SHOPPING SYSTEM

[75] Inventors: Kay Yonezawa; Kazumi Rissen, both of Kawasaki; Ryouji Kawabe; Akihiro Yoshida, both of Yokohama, all of Japan

[73] Assignee: Hitachi, Ltd., Tokyo, Japan

[21] Appl. No.: 08/939,338

[22] Filed: Sep. 29, 1997

[30]      Foreign Application Priority Data

Sep. 30, 1996  [JP]  Japan ................................. 8-258289

[51] Int. Cl.$^6$ ............................. G06F 7/06; G06F 17/36
[52] U.S. Cl. ................................ 705/27; 705/26; 705/1
[58] Field of Search ................... 705/27, 26, 1; 345/121, 145, 335

[56]            References Cited

U.S. PATENT DOCUMENTS

| | | | |
|---|---|---|---|
| 5,671,279 | 9/1997 | Elgamal | 380/23 |
| 5,710,887 | 1/1998 | Chelliah et al. | 705/26 |
| 5,745,681 | 4/1998 | Levine et al. | 395/200.3 |
| 5,826,242 | 10/1998 | Montulli | 705/27 |
| 5,835,712 | 11/1998 | DuFresne | 395/200.33 |

*Primary Examiner*—Allen R. MacDonald
*Assistant Examiner*—Penny Caudle
*Attorney, Agent, or Firm*—Fay, Sharpe, Beall, Fagan, Minnich & McKee

[57]            ABSTRACT

In an online shopping system having a shopping basket function capable of conducting an order process in onetime by storing items to be purchased in a purchase list, an interface for the shopping basket function is provided as a shopping basket window separate from a catalog window for displaying item data of the online shopping. The shopping basket window is placed near a pointer displayed on the catalog window and a display position thereof is moved in linkage with the movement of the pointer. The shopping basket function includes a list of items to be purchased which is a main body of the shopping basket, a function to add item data to the list, and a function to change the item information registered in the list. Preferably, the shopping basket main body is not constantly displayed. Instead, an interface function to recall the content display of the shopping basket is provided in the shopping basket window.

21 Claims, 7 Drawing Sheets

FIG.5

| SHOP CODE | ITEM CODE | ITEM NAME | UNIT PRICE |
|---|---|---|---|
| HANA | B-01 | BUNCH OF ROSES (RED) | 5,000 |
| HANA | B-02 | BUNCH OF TULIPS (YELLOW) | 4,500 |
| HANA | B-03 | BUNCH OF ROSES (PINK) | 4,500 |
| ⋮ | ⋮ | ⋮ | ⋮ |

| SHOPPING BASKET ID | 0808153101 | |
|---|---|---|

600   602

| SHOP CODE | ITEM CODE | NUMBER |
|---|---|---|
| HANA | B-01 | 1 |
| HANA | B-05 | 2 |
| TANE | S-13 | 1 |
| ⋮ | ⋮ | ⋮ |

604   606   608

SHOPPING BASKET PRESENTATION METHOD FOR AN ONLINE SHOPPING SYSTEM

BACKGROUND OF THE INVENTION

The present invention relates to an online shopping system for a consumer to order and purchase items by using a computer, and more particularly to a method for providing an online shopping system having an interface function for allowing an consumer to efficiently select and confirm items to be purchased and such an interface function.

Recently, an online shopping system which allows examination, selection and order of items through a computer has been put into practice. In such an online shopping system, in order to supplement a disadvantage by a gap from ordinary shopping caused by the use of electronic means such as not capable of directly touching the item and not capable of getting assistance of a real salesman, various devices for a user interface have been made. As one of such devices, a so-called shopping basket function which has some analogy with shopping basket used in a shop such as supermarket is proposed. In this function, items on the online shopping are temporarily added to a purchase list and a process of order and purchase is conducted when all items to be purchased are registered on the list, as items to be purchased in the supermarket are once put into a shopping basket and lastly the account is settled at a counter. In this manner, by preparing the purchase list to order a plurality of items one time, a time required to purchase may be substantially saved. Further, the consumer may prevent the failure of shopping and stop the purchase of unnecessary items by checking the list once before the purchase. Further, because of feel of easiness that the items once added on the purchase list may be finally changed in any way before the purchase, there is a psychological effect that the consumer may proceed shopping readily.

The elements which constitute the shopping basket are a shopping basket main body (purchase list) and a function for taking in and out items for the shopping basket. As functions associated with the shopping basket, there are a function to take the items into the shopping basket (add to the purchase list), a function to check the contents of the shopping basket (display the purchase list), a function to return the item in the shopping basket (change the purchase list) and a function to purchase the items in the shopping basket. However, for the function to purchase the items, only the order is accepted because the delivery of the items is made later except a portion of items which can be downloaded as digital data and the shopping is not completed until the items are received and the account is settled.

As one of methods for proving the shopping basket to the consumer, there is a method of displaying a button for the shopping basket on the same display page as a catalog which the consumer watches as it is realized in the online shopping system mainly on the World Wide Web. As another method of proving the shopping basket, there is a method for separately displaying an item catalog area and a shopping basket area. Such a function is used in the shopping system provided by a CD-ROM.

SUMMARY OF THE INVENTION

A main stage of the online shopping is an item catalog screen on which information on the items is provided. The consumer examines the item on the screen and if he or she likes it, he or she takes it into the shopping basket. During the shopping, he or she examines the content of the shopping basket as required to check the item scheduled to purchase and the pay amount of the items. Accordingly, it is not necessary to always display the purchase list on the screen, but the functions to access to the shopping basket for taking in the items and to display the contents should be available to the consumer any time during the shopping.

As described above, when the button for the shopping basket is on the same page as the item catalog, the entire length of the page changes depending on the amount of item data described on the catalog, the page may not be accommodated on the display screen. In such a case, it is necessary for the consumer to scroll the page to press the button to display the button for the shopping basket in order to display the button. The same is true when the button is located at the top end of the page, and when the item of interest is at a lower portion of the page, the screen must be scrolled upward in order to take the item into the shopping basket after the confirmation. The state in which the necessary function is not displayed without scrolling not only imposes a burden to the operation of scroll, and when the consumer first uses the system, the operation to be conducted next is hard to understand and cause anxiety to the user. On the other hand, in the method of always displaying the button in a specified area by dividing the screen, the above problem is solved. However, the specified area on the display is occupied for the display of the button. Thus, there is a disadvantage that the area on the display available for the display of the item catalog is narrowed.

Further, as a feature of an application on the Internet such as the World Wide Web, high freedom of both information provider and user is pointed out. For example, the user cannot previously limit the length of one page of the contents prepared by the information provider. The environment of the user such as a resolution of the display, a type of browser software used and the setting of font varies from user to user and the information provider cannot know it. As a result, however the information provider devises the amount of information and the layout described on the page to accommodate it in the screen, the intended effect is not always achieved depending on the environment of the user. In the method of placing the button for the shopping basket on the same page as the catalog, some degree of scrolling is unavoidable. On the other hand, the method of dividing the screen and sharing the roles by the respective sub-areas restricts the method for preparing the contents. It may be good that the user interface is uniform in one online shop but when it is applied across a plurality of online shops of various items and scales, free design cannot be conducted. This forces to the user a specific environment such as to watch the window of the browser at a specified size and hence it does not conform to the Internet.

It is an object of the present invention to provide a shopping basket presentation method capable of simply utilizing a shopping basket while a consumer browses an item catalog.

It is another object of the present invention to provide a shopping basket presentation method capable of effectively utilizing an online shop screen as an item catalog.

In accordance with the present invention, an interface for providing the shopping basket function is provided as a separate shopping basket window from a catalog window on which online shop item data is displayed. The shopping basket window is displayed on the catalog window and a display position is moved in linkage with the movement of a mouse pointer. The shopping basket includes a list of items to be purchased which is a main body of the shopping basket, a function to add the item data to the list, and a function to change the item data registered in the list. In one embodiment of the present invention, the shopping basket main body is not always displayed. Instead, an interface function to display the shopping basket contents on the screen is provided on the shopping basket window.

BRIEF DESCRIPTION OF THE DRAWINGS

FIG. 5 shows a data structure of an example of an item database structure, FIG. 6 shows a data structure of an example of shopping basket data stored in a shopping server.

DESCRIPTION OF THE PREFERRED EMBODIMENTS

Figure 1:
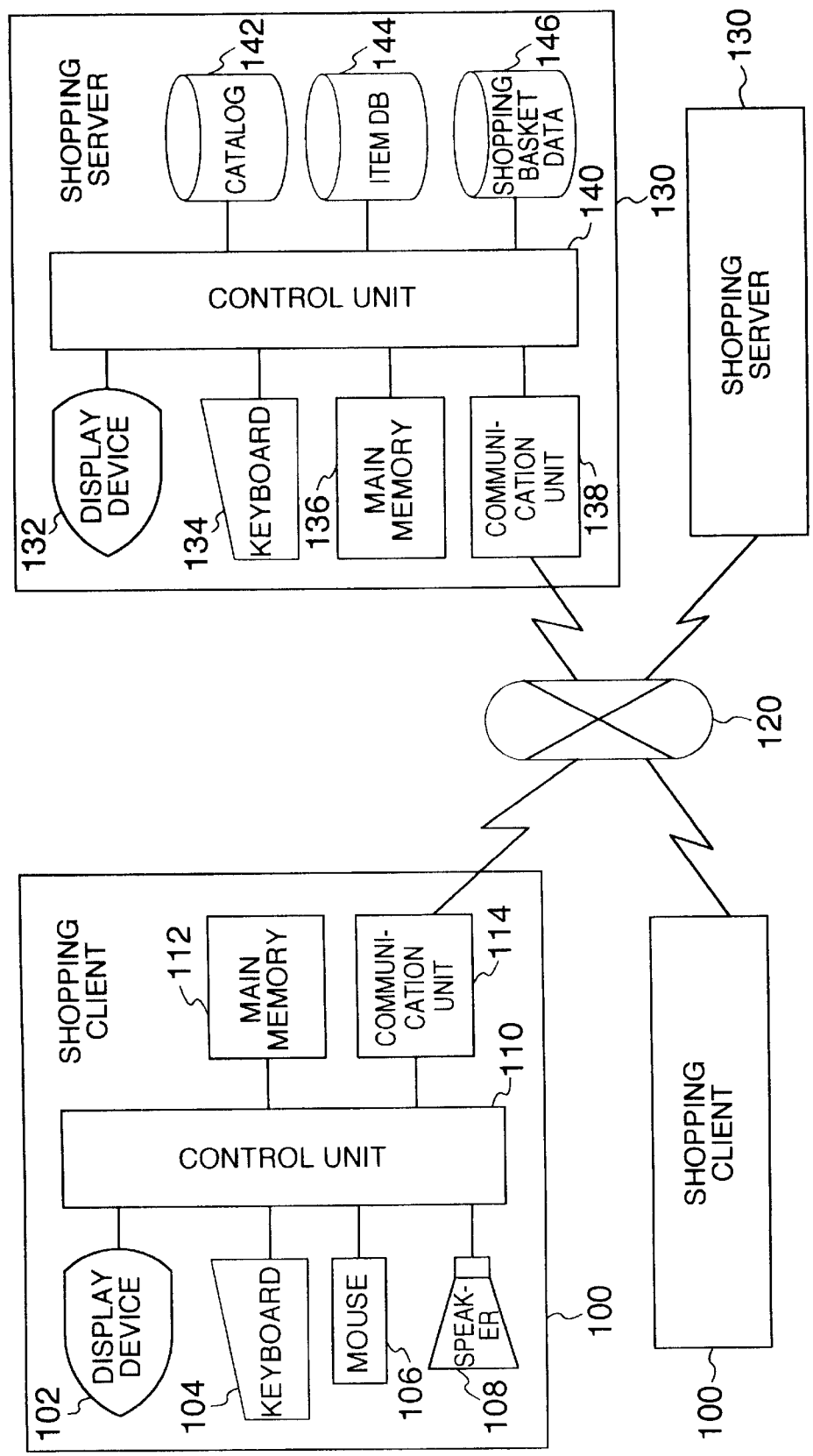
FIG. 1 shows a block diagram of a system configuration in one embodiment of a online shopping system in accordance with the present invention.

FIG. 1 shows a block diagram of an example of a system configuration of the online shopping system in accordance with the present invention. In FIG. 1, numeral 100 denotes a shopping client which a consumer uses for online shopping. Numeral 102 denotes a display device used to display catalog data of the items. Numeral 104 denotes a keyboard and a numeral 106 denotes a mouse. They are used by the consumer for the operation of the catalog and the shopping basket. Numeral 108 denotes a speaker which outputs audio information when information by audio is included in the catalog. Numeral 110 denotes a control unit which realizes various functions of the shopping client 100 in accordance with a program stored in a main memory 112. The shopping client 100 exchanges data with a shopping server to be described later thorough a network 120 such as PSTN (public switched telephone network) or Internet via the communication unit 114 to realize the shopping process. As the shopping client 100, a dedicated terminal device as well as a general purpose information terminal device such as a so-called personal computer (PC) may be used.

Numeral 130 denotes a shopping server of the online shopping. The shopping server 130 comprises a display device 132, a keyboard 134, a main memory 136, a communication unit 138 and a control unit 140. The control unit 140 transmits catalog data 142 in response to a request from the shopping client 100. When the shopping basket function is required by the shopping client, it changes the content of the shopping basket data by using the information stored in the item database 144. The catalog data 142, the item database 144 and the shopping basket data 145 are stored in a memory unit such as a disk device which is accessed by the control unit 140. The display device 132 and the keyboard 134 are used for the maintenance of the program and the data in the shopping server 130. The shopping client 100 is connected to the network 120 through the communication unit 138.

In the present embodiment, there are a plurality of shopping servers 130 and the shopping clients 100, respectively connected to the network 120 Each shopping client 100 may access to any shopping server 130. The shopping basket data is maintained for each shopping server 130 and the shopping is completed in each shopping server 130.

Figure 2:
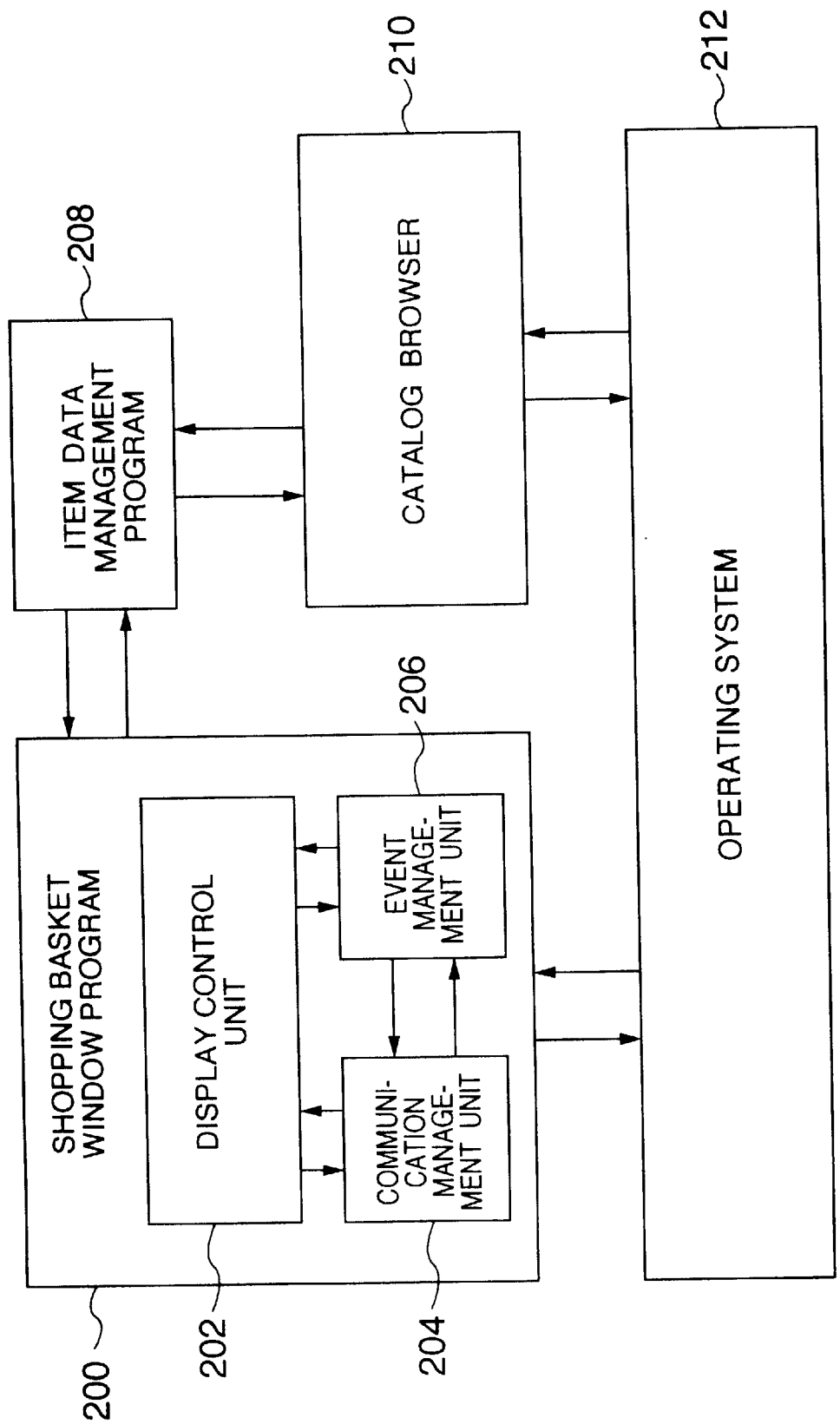
FIG. 2 shows a block diagram of a functional configuration of a client shopping program of a consumer.

FIG. 2 shows a functional configuration of a shopping program provided in the shopping client 100 (consumer client) in the online shopping system in accordance with the present invention. In FIG. 2, numeral 200 denotes a shopping basket window program for providing the shopping basket function and comprises a display control unit 202, a communication management unit 204 and an event management unit 206. The event management unit 206 receives and interprets the information on the event sent from the operating system 212 generated by the mouse 106 and the keyboard 104 and delivers the messages related to the display change and the communication control to the display control unit 202 and the communication management unit 204. The display control unit 202 receives the message on the change of display from the event management unit 206 to control the display position of the shopping basket window which is an interface to provide the shopping basket function. The communication management unit 204 conducts the communication with the shopping server 130 in response to the message on the communication control from the event management unit 206. Numeral 208 denotes an item data management program which sends to the shopping basket window program 200 the information on the selected items on the item catalog displayed on the display device 102 by the catalog browser 210, that is, the information on the items to be added to the shopping basket.

The catalog browser 210, the item data management program 208 and the shopping basket window program 200 may be distributed in a form stored in a carrigeable storage medium such as a compact disk or a floppy disk. They may be distributed from the shopping server 130 or other computer through the network 120 to the shopping client 100.

The configurations shown in FIGS. 1 and 2 are mere examples to implement the present invention and other configurations may be adopted. For example, in the present embodiment, the shopping basket main body, that is, the list of the purchase items selected by the consumer from the item catalog is stored on the shopping server 130 as the shopping basket data 146 but it may be held in the shopping client 100 and transferred to the server 130 when the order process is designated. The catalog browser 210 is not necessarily the application program dedicated to the online shopping but the item catalog may be browsed in the same manner as that to browse the page of other World Wide Web in the window shopping by using the World Wide Web browser and if an item to be purchased is found, the operation to the shopping basket may be conducted by using the item management program and the shopping basket window program.

Figure 3:
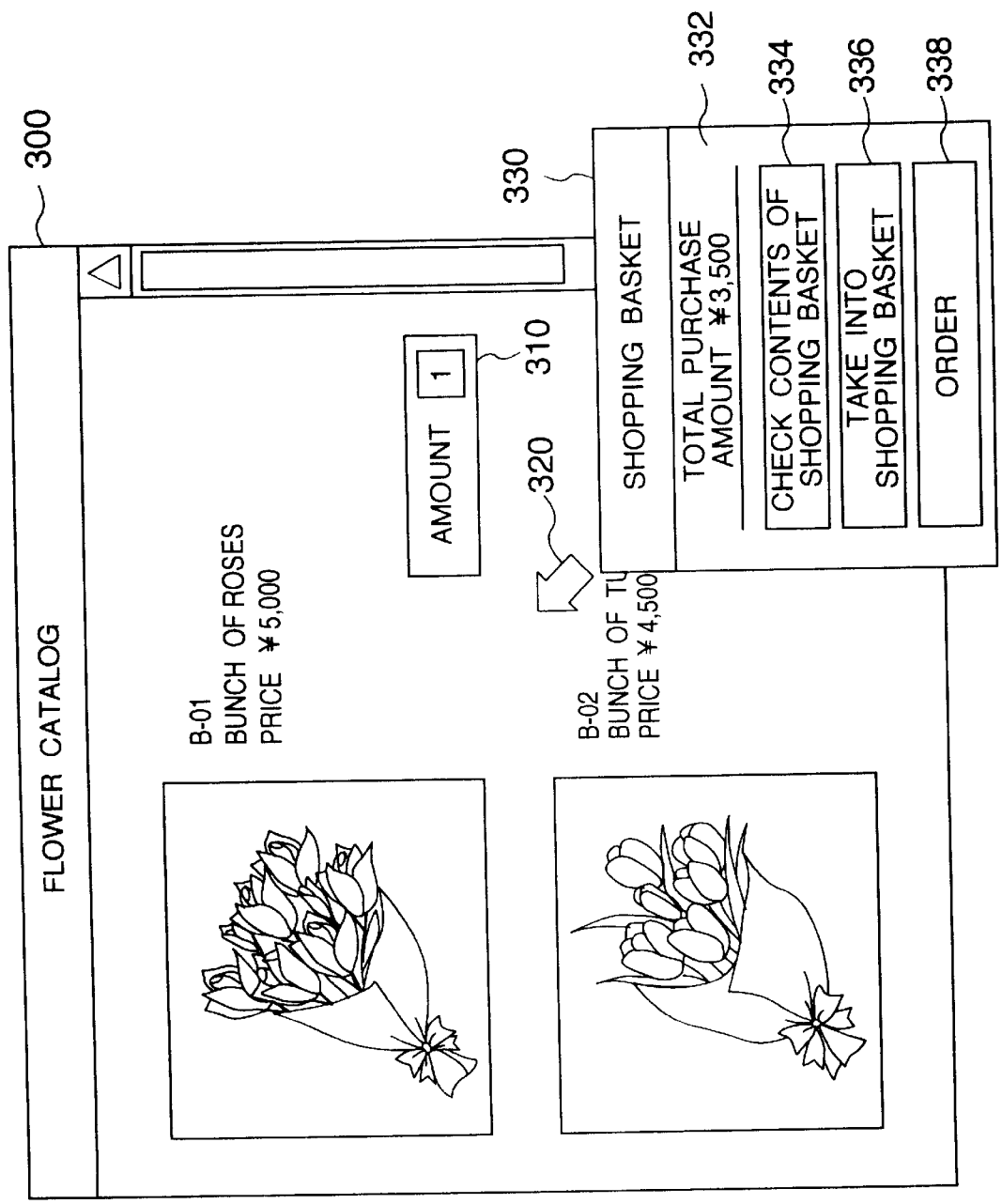
FIG. 3 shows a screen configuration of one example of a screen displayed on a client display of the consumer during the shopping.

FIG. 3 shows an example of a consumer screen displayed on the display device 102 during the shopping in the online shopping system in accordance with the present embodiment. In FIG. 3, numeral 300 denotes a catalog browser window (hereinafter referred to as a catalog window) the display of which is controlled by the catalog browser 210, and the item data (item catalog) expressed by character or image is displayed thereby. Numeral 310 denotes an area displayed by the item data management program 208 and it is displayed inline in the catalog window 300. In the present embodiment, when the consumer inputs the number of items to be purchased, the item data management program 208 informs the item data of the item corresponding to the area and the input number of item to the shopping basket window 200. Numeral 330 denotes a shopping basket window which is always displayed in front of the catalog window 300 and is moved on the screen to follow the mouse pointer 320. The information on the items to be purchased and the button to operate the shopping basket are displayed on the shopping basket window 330. In the present embodiment, a total payment amount 332 in the information on the items to be purchased, a button 334 for calling the display of the contents of the shopping basket, a button 336 for taking the item into the shopping basket, and a button 338 for ordering the items of the shopping basket are displayed.

Figure 4:
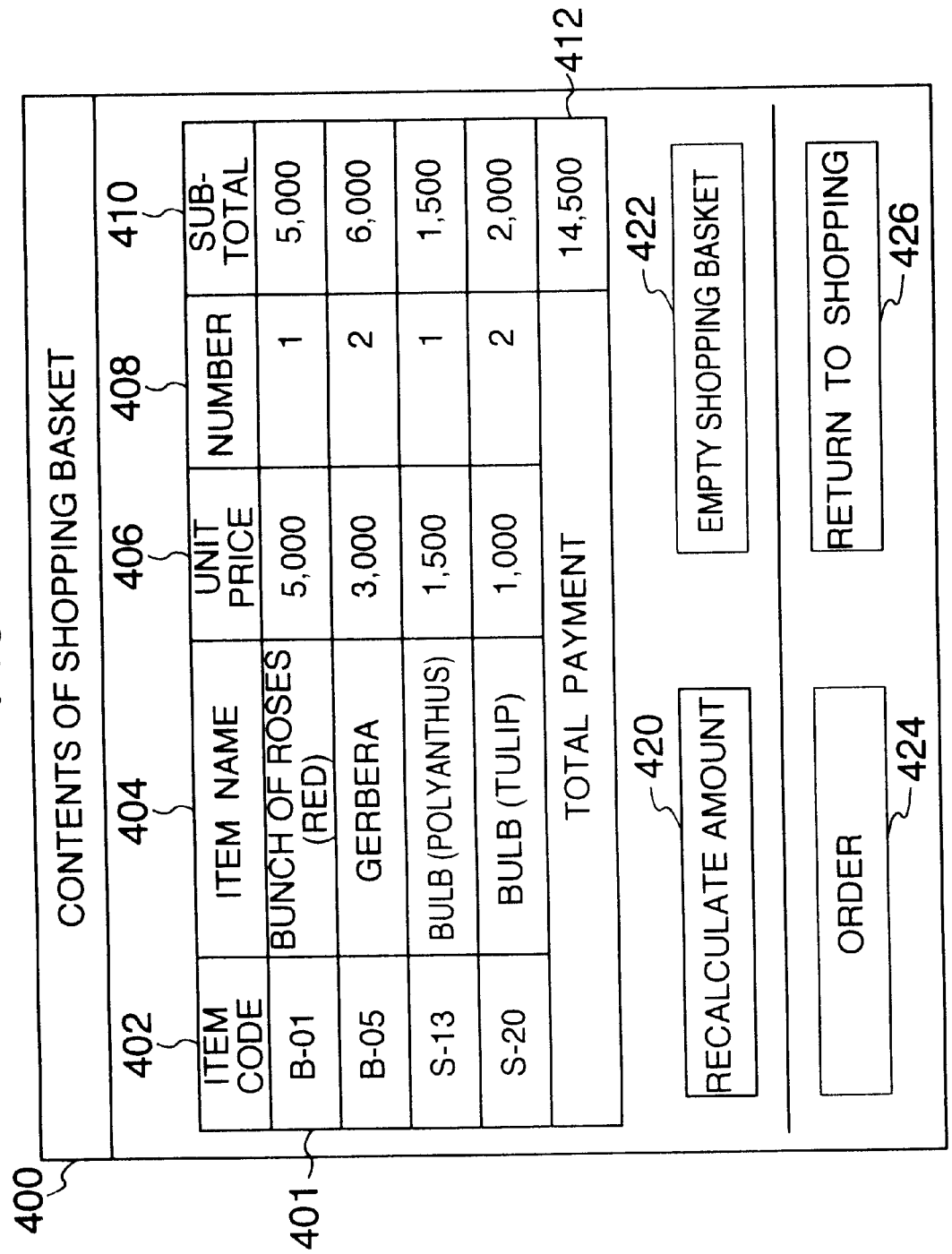
FIG. 4 shows a screen configuration of an example of a screen displaying the content of the shopping basket.

FIG. 4. shows an example of a screen displaying the content of the shopping basket in the online shopping system in accordance with the present embodiment. The display screen is displayed when the button 334 of the shopping basket window is depressed. In FIG. 4, numeral 400 denotes a shopping basket content display screen, numeral 401 denotes information on the item scheduled to purchase, numeral 402 denotes an item code of an item to be purchased, numeral 404 denotes an item name, numeral 406 denotes a unit price, numeral 408 denotes the number of items to be purchased, numeral 410 denotes a sub-total of a purchase amount for each item and numeral 412 denote a total pay amount for all items. The number of items to be purchased 408 may be changed by the consumer on the screen. In this case, when a recalculation button 420 is depressed by the consumer, the information on the changed number of items to be purchased is sent to the shopping server 130 and the change of the content of the shopping basket and the recalculation of the purchase amounts 410 and 412 are conducted. The consumer may depress a button 422 for empty the shopping basket to clear all items in the shopping basket. Numeral 424 denotes a button for conducting an order process of the items in the shopping basket and numeral 426 denotes a button for erasing the display of the content of the shopping basket and returning to the catalog to continue the shopping.

FIG. 5 shows an example of information on the items stored in the item database 144 and FIG. 6 shows an example of the contents of the shopping basket of each consumer stored in the shopping basket data 146. In FIG. 5, numeral 500 denotes a shop code for identifying a shop which handles the items, numeral 502 denotes an item code applied to identify individual item, numeral 504 denotes an item name of individual item and numeral 506 denotes an area for storing a unit price of the item. In FIG. 6, numeral 600 denotes a shopping basket table which stores information on one shopping basket, numeral 602 denotes a shopping basket ID for identifying each of the consumers, numeral 604 denotes a shop code, numeral 606 denotes an item code and numeral 608 denotes an area which stores the number of items to be purchased. In the present embodiment, a shopping basket ID is assigned for each shopping client 100. The shopping basket table 600 is prepared and managed for each shopping basket ID. When data is exchanged between the shopping client 100 and the shopping server 130, the shopping basket ID is sent together with the data so that the shopping basket data corresponding to the shopping basket ID is managed. In the present embodiment, in this manner, each consumer may utilize the dedicated shopping basket. In the present embodiment, the shopping basket data 146 holds the information on the item names placed in the shopping basket and the number of items thereof. The information necessary to display the content of the shopping basket and to order the items is generated by using the shopping basket data 146 as well as the information held in the item database 144.

Figure 7:
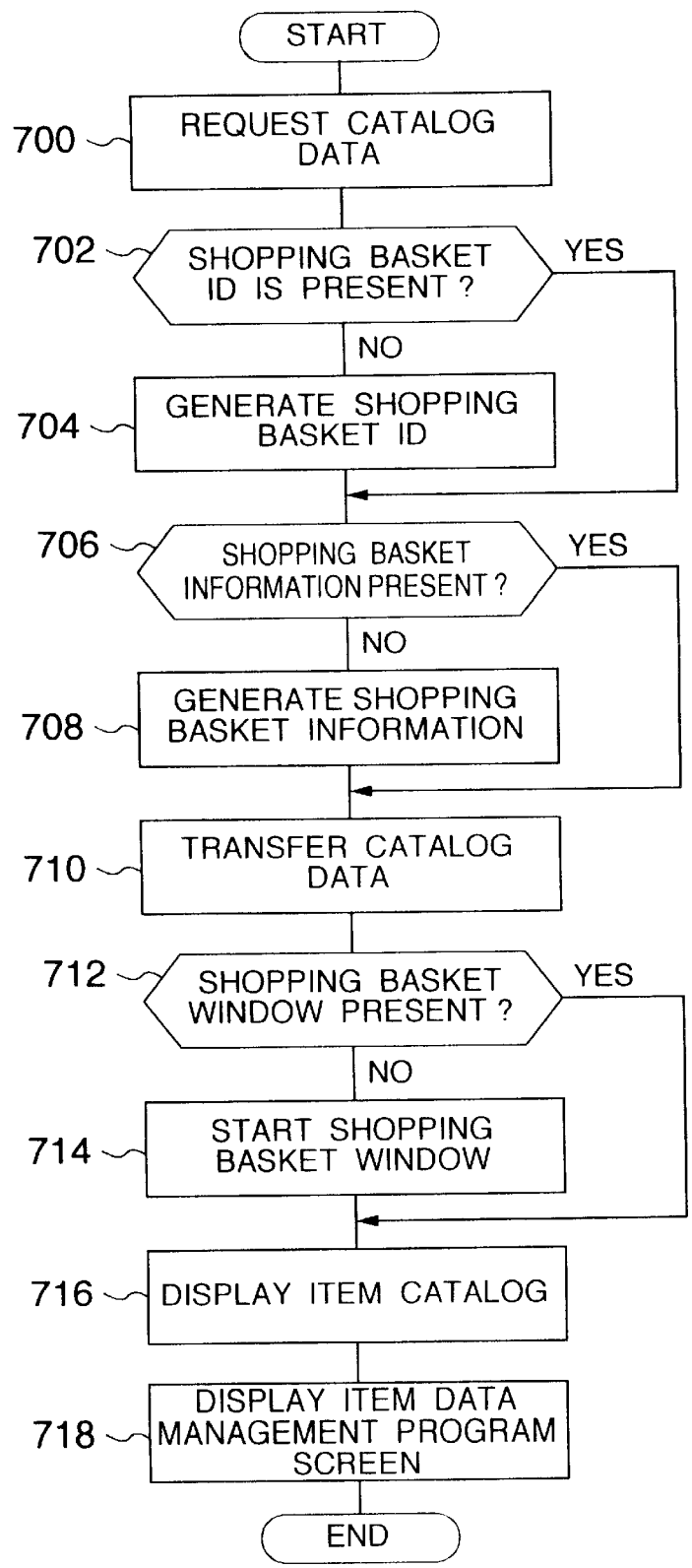
FIG. 7 shows a flow chart of a procedure of a process conducted when displaying the item catalog.

FIG. 7 shows a flow chart of a process conducted when the item catalog is displayed in the shopping client in the online shopping system in accordance with the present embodiment. In conducting the shopping, the consumer starts the catalog browser 210 of the shopping client 100 to connect with a desired shopping server 130. When the connection to the shopping server 130 is made, the catalog browser 210 requests the item catalog data to the shopping server 130 (step 700).

When the item catalog data is requested from the catalog browser 210 of the shopping client 100, the shopping server 130 checks the presence or absence of the shopping basket ID assigned to shopping client 100 prior to the sending of the item catalog data to the shopping client 100 (step 702). If the shopping basket ID is absent, a shopping basket ID is newly generated (step 704). Then, whether the shopping basket table 600 corresponding to the shopping basket ID is present in the shopping basket data 146 on the shopping server 130 or not is determined (step 706). If the corresponding shopping basket table 600 is absent, a new shopping basket table for the shopping basket ID is prepared (step 708). After the above process, the shopping server 130 extracts the item catalog information to be transferred to the shopping client from the item catalog data 142 and transfers the item catalog data to the shopping client 100. At this time, the step 704 has been conducted and if a new shopping basket ID has been generated, the shopping basket ID is sent to the shopping client 100 together with the item catalog information (step 710). The shopping basket ID transferred to the shopping client 100 is held in the catalog browser 210 and the shopping basket window program 200, and subsequently it is used when the data is transferred from the shopping client 100 to the shopping server 130.

When the shopping client 100 receives the item catalog data from the shopping server 130, it determines whether the shopping basket window program 200 has been started or not (step 712). If the shopping basket window program 200 has not been started, it starts the shopping basket window program 200 to display the shopping basket window 330 on the display device 102 (step 714). In the present embodiment, it is assumed that only one shopping basket window 330 is present at one time and the shopping basket window program 200 is terminated when the catalog browser 210 is terminated.

The item catalog data sent from the shopping server 130 includes information for explaining the items using characters and images as well as the item data used for the order such as the shop codes and the item codes. The catalog browser 210 displays the item explanation information included in the sent item catalog data and displays the screen corresponding to the item explanation information in the catalog window of the display device 102 (step 716). Further, the catalog browser 210 starts the item data management program 208 to deliver the item data in the item catalog data. The item data management program 208 displays the item data on the display device 102 in accordance with the received item data (step 718).

Figure 8:
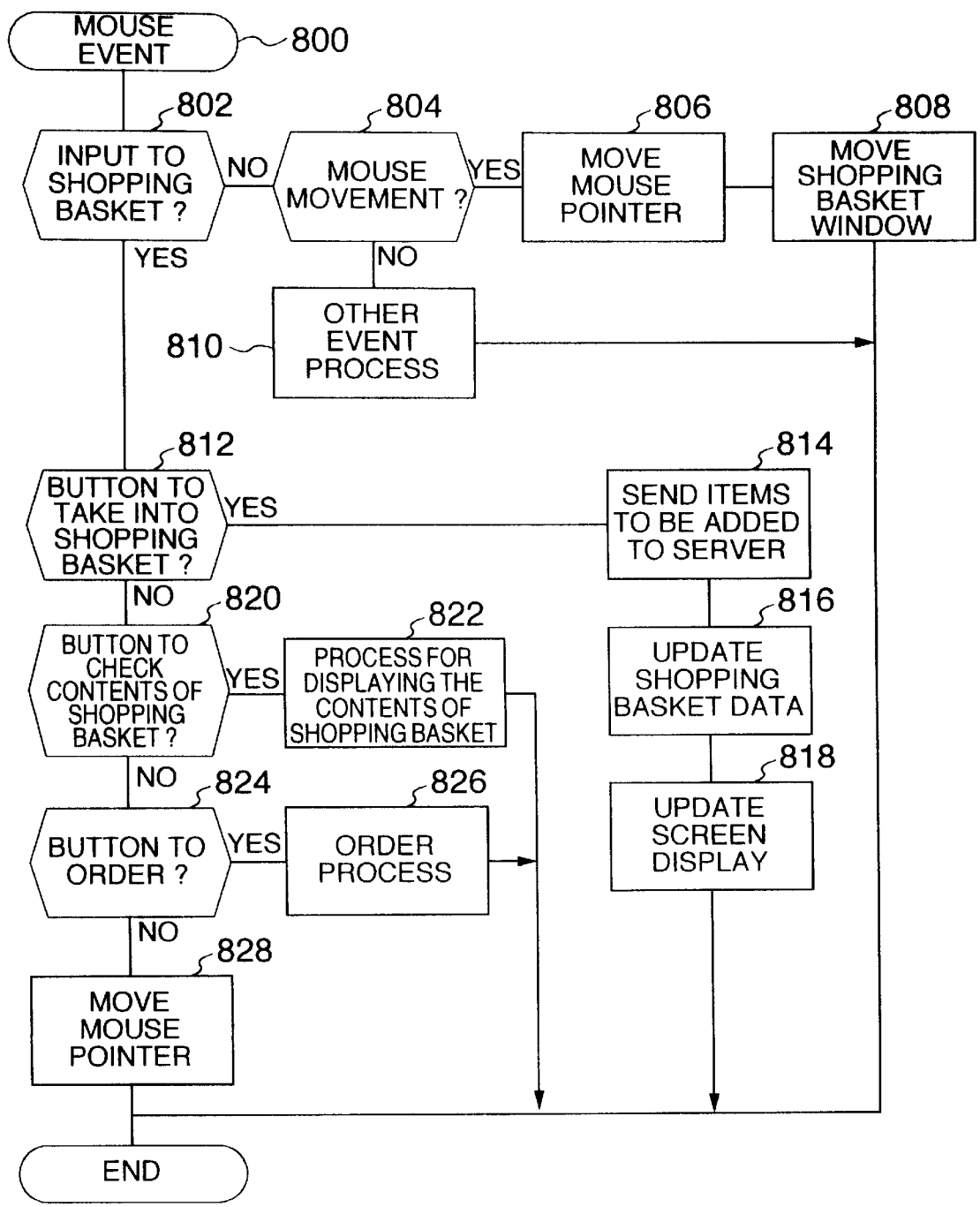
FIG. 8 shows a flow chart of an example of a procedure of a process when a mouse operation is conducted for the shopping window.

FIG. 8 shows a flow chart of a process flow when the mouse operation is conducted by the consumer. It is desirable that a method of operation conducted by the consumer on the catalog browser window 330 in the shopping is uniform whether or not the shopping basket window 330 is displayed. In the present embodiment, when the mouse 106 is moved in a normal state, the mouse pointer on the screen is moved and the shopping basket window 330 also follows the mouse pointer 320. However, in the operation to the shopping basket such as taking the item into the shopping basket, it is necessary to bring the mouse pointer 320 on the shopping basket window 330. In the present invention, a specific input method, for example, the operation to move and click the mouse 106 while depressing a shift key of the keyboard is handled as the operation to the shopping basket window 330. This operation method to the shopping basket window 330 may be other method so long as it does not conflict to the normal window operation and the operation to the catalog browser window 300 and a method convenient to use for the user may be set.

When a mouse event occurs by the operation of the mouse 106 by the consumer (step 800), whether the mouse event has been defined as an operation of the shopping basket window 300 or not is determined (step 802). If it is not the operation to the shopping basket, such a mouse event is handled as an ordinary mouse event. If it is determined as the ordinary mouse event in the step 802, whether the generated mouse event is the movement of the mouse 106 or not is determined (step 804). If the mouse event is the movement of the mouse 106, the control unit 110 moves the display position of the mouse pointer 320 on the screen in accordance with the movement of the mouse 106 (step 806). It also moves the display position of the shopping basket window 330 by the same amount as the amount of movement of the mouse pointer 320 (step 808). In the step 804, if it is determined that the generated mouse event is other than the movement of the mouse 106, the corresponding event process is conducted (step 810).

In the step 802, if it is determined that the mouse event is the input to the shopping basket window 330, whether the generated mouse event is the selection of the button 336 to take the item into the shopping basket or not is determined (step 812). If it is the selection of the button 336 to take the item into the shopping basket, the catalog browser 210 sends the item data of the items the number of which are input in a field 310 to the shopping server 130 together with the held shopping basket ID (step 814). When the shopping server 130 receives the information sent from the shopping client 100, it selects the corresponding shopping basket table 600 based on the shopping basket ID included in the information and adds the sent item data (step 816). When the item data is added to the shopping basket, the current total pay amount is calculated on the shopping server 130 based on the updated shopping basket table 600 and the item database 144 and the information thereof is sent to the shopping client 100. In the shopping client 100, the shopping basket window program 200 updates the display 332 of the shopping basket window 330 based on this information and clears the item number field 310 through the item data management program 208 (step 818).

In the step 812, if it is determined that the generated mouse event is not the selection of the button 336 to take the item into the shopping basket, whether the button 334 to check the contents of the shopping basket has been selected or not is determined (step 820). If the button 334 to check the contents of the shopping basket has been selected, the transfer of the information on the items taken into the shopping basket is requested to the shopping server 130. In response to the request, the shopping server 130 generates the information necessary to display the contents of the shopping basket from the item data registered in the corresponding shopping basket table 600 and the information in the item database 144 corresponding to the items and sends it to the shopping client. The client 100 conducts a display process of the screen 400 on which the content of the shopping basket is displayed based on the information sent from the shopping basket window program 200 (step 822).

On the other hand, if it is not the selection of the button 334 to check the contents of the shopping basket, whether the order button 338 has been selected or not is determined (step 824). If the mouse event is the selection of the order button 338, a process to order the item in the shopping basket is conducted (step 826). If the decision is negative in the step 824, the mere movement process of the mouse pointer 320 is conducted. At this time, the movement of the display position of the shopping basket window is not conducted. Such a mouse event occurs, for example, when the consumer attempts to move the mouse pointer into the shopping basket window 330 in order to utilize the shopping basket function (step 828).

In accordance with the present invention, since the shopping basket window is displayed to follow the mouse button, the shopping basket function is always displayed immediately close to the mouse pointer. Accordingly, the consumer simply may utilize the shopping basket function while watching the items on the online shopping. For example, when the consumer looks at the item and wants to purchase it, he or she may immediately take it into the shopping basket on site and confirm the contents of the shopping basket so that the operation and the time to use the shopping basket function is reduced. In this manner, the consumer may conduct the shopping on the online shopping with a sense close to that of the real shopping and may concentrate to the shopping without being puzzled since the necessary function is always visible. Further, since the shopping basket window is displayed on the separate window from that of the online shopping main body and it may be moved to a non-disturbing location by moving the mouse when the items are to be checked, the area on the screen available to display the item data as the catalog may be widened. Further, since only the information on the items may be described as the catalog contents and the shopping basket function may be separated, the preparation of the item catalog is easy and the speedy update may be attained.

In the embodiment described above, only the total price is displayed on the shopping basket window as the information on the items in the shopping basket, other information, for example, the number of items in the shopping basket may be displayed. Such information is aid for the consumer to grasp the amount of shopping but it need not be always displayed. As another method to make the consumer recognize the contents of the shopping basket and prevent the taking of items into the shopping basket in failure and finally overpurchase, there is a method for displaying the content of the shopping basket on the screen 400 each time the item is taken into the shopping basket. Further, in addition to the buttons for taking the item into the shopping basket, displaying the content, and sending order, other function, such as a button to empty the content of the shopping basket, which functions to change the content of the shopping basket may be provided. However, in order to utilize the advantage that the consumer may operate the shopping basket while browsing the item catalog, at least the button to take the item into the shopping basket is to be provided.

In the above embodiment, the shopping basket window is always in the visible state, but the user who has no intention to immediately purchase but merely watching the items may feel it hinder. As countermeasure for such a case, the display of the shopping basket window may be erased in response to the indication by the consumer or it may be brought to the back of the browser and displayed on the front when called to move it together with the mouse.

What is claimed is:

1. A shopping basket presentation method in an online shopping system provided with a server having item data including information on items presented to a consumer and shopping basket data including information on items specified by the consumer, a client operated by the consumer and including a display device and an input device, and a network for connecting said server and said client, comprising the steps of:

transferring the item data from said server to said client;

displaying the item data in a catalog window on a screen of said display device in said client;

displaying a shopping basket window which is different from said catalog window as an interface for conducting an operation of the shopping basket data; and moving a pointer displayed on said display device in accordance with the operation of said input device by the consumer and moving a display position of the shopping basket window in linkage with the movement of the pointer.

2. A shopping basket presentation method according to claim 1 wherein a first button to display the information on the items registered in the shopping basket data and a second button to register the item in the shopping basket data are displayed in the shopping basket window for the user's selection.

3. A shopping basket presentation method according to claim 2 further comprising the steps of:

acquiring information on the item registered in the shopping basket data in response to the selection of said first button; and displaying the acquired information on the items in the shopping basket window.

4. A shopping basket presentation method according to claim 3 further comprising the steps of:

receiving a change command for the information on the items displayed in the shopping basket window;

transferring a change request for the shopping basket data in accordance with the received change command from said client to said server; and changing the information registered in the shopping basket data in accordance with the change request.

5. A shopping basket presentation method according to claim 2 further comprising the steps of:

transferring the information on the items specified by the consumer from said client to said server in response to the selection of said second button; and additionally registering the information on the items to the shopping basket data in said server.

6. A shopping basket presentation method according to claim 1 wherein the information on the items registered in the shopping basket data is displayed in said shopping basket window.

7. A shopping basket presentation method according to claim 1 further comprising the step of:

detecting a predetermined operation conducted to said input device; and moving the pointer independently from the shopping basket window in response to the predetermined operation.

8. An online shopping system comprising:

a network;

a shopping server connected to said network and having an item data file for storing item data on sale items and a shopping basket data file for holding information on selected items designated by a consumer as shopping basket data; and a shopping client connected to said network and having a display device, an input device, catalog display means for displaying an item catalog on said display device based on item catalog data sent from said shopping server and shopping basket window control means for controlling the display of a shopping basket window which is a different window from that for displaying the item catalog and functions as an interface for an operation of the shopping basket data;

wherein said shopping basket window control means moves a display position of the shopping basket window in linkage with a pointer moved and displayed on said display device in accordance with the operation of said input device.

9. An online shopping system according to claim 8 wherein said shopping basket window control means displays in said shopping basket window a first button for displaying the information on the selected items registered in said shopping basket data file and a second button for registering the selected items in said shopping basket data file.

10. An online shopping system according to claim 9 wherein said shopping basket window control means acquires the information on the selected item registered in said shopping basket data file in response to the selection of said first button by said input device and displays acquired information on the selected items in said shopping basket window.

11. An online shopping system according to claim 10 wherein said shopping basket window control means receives a change command for the information on the selected items displayed in said shopping basket window and sends a change request for said shopping basket data file to said server in accordance with the received change command.

12. An online shopping system according to claim 9 wherein said shopping basket window control means transfers the item data on the selected items designated by the consumer in response to the selection of said second button.

13. An online shopping system according to claim 8 wherein said shopping basket window control means displays the information on the selected items registered in said shopping basket data file.

14. An online shopping system according to claim 8 wherein said shopping basket window control means displays said shopping basket window independently from the movement of said pointer in response to the predefined operation of said input device.

15. A terminal device connected to a shopping server through a network used by a consumer for online shopping, comprising:

a display device;

an input device;

catalog display means for displaying an item catalog on said display device in accordance with item catalog data sent from said shopping server; and shopping basket window control means for controlling the display of a shopping basket window which is a different window from that for displaying said item catalog and functions as an interface for the operation of shopping basket data including information on items selected by the consumer, the shopping basket data being held in said shopping server;

wherein said shopping basket window control means moves a display position of the shopping basket window in linkage with a pointer moved and displayed on said display device in accordance with the operation of said input device.

16. A terminal device according to claim 15 wherein said shopping basket window control means displays in said shopping basket window a first button for displaying the information on the selected items and a second button for registering the selected items in said shopping basket data.

17. A terminal device according to claim 16 wherein said shopping basket window control means acquires the information on the selected items registered in said shopping basket data in response to the selection of said first button using said input device and displays acquired information on the selected items in said shopping basket window.

18. A terminal device according to claim 17 wherein said shopping basket window control means receives a change command for the information on the selected items displayed in said shopping basket window from said input device and sends a change request of said shopping basket data to said server in accordance with the received change command.

19. A terminal device according to claim 16 wherein said shopping basket window control means transfers the item data on the selected items designated by the consumer in response to the selection of said second button.

20. A terminal device according to claim 15 wherein said shopping basket window control means displays the information on the selected items registered in said shopping basket data.

21. A terminal device according to claim 15 wherein said shopping basket window control means displays said shopping basket window independently from the movement of said pointer in response to the predefined operation of said input device.

* * * * *